United States Patent Office 3,766,069
Patented Oct. 16, 1973

3,766,069
EXTREME PRESSURE LUBRICATING OIL ADDITIVES
Bruce W. Hotten, Orinda, Calif., assignor to Chevron Research Company, San Francisco, Calif.
No Drawing. Filed July 26, 1971, Ser. No. 164,870
Int. Cl. C10m 1/38
U.S. Cl. 252—48.6                                 5 Claims

ABSTRACT OF THE DISCLOSURE

Lubricating oil additives comprising a class of sulfurized hydroxyesters are provided, which have the properties of extreme pressure lubrication, stability and noncorrosivity towards copper. The hydroxyesters are the product of the reaction of an epoxide with a fatty acid or a derosinified tall oil.

BACKGROUND OF THE INVENTION

Field of the invention

Boundary lubrication is characterized by control of friction and wear under high load conditions; it appears to depend on the properties of the lubricant other than its viscosity. Friction under boundary lubrication conditions generally tends to be higher than that usually associated with fluid film lubrication.

The kinetic coefficient of friction, $f_K$, is defined as the ratio of the force which resists sliding of one surface over another divided by the load between the surfaces. Under "dry" sliding conditions, coefficients of friction range from about 0.2 to 0.7. Satisfactory boundary lubrication is achieved when the coefficient of friction is reduced substantially below 0.2. The static coefficient of friction, $f_S$, is related to the force necessary to overcome inertia and is somewhat higher than $f_K$ under both dry and lubricated conditions.

Lubricants are often called upon to perform under conditions of high ambient temperature. Frictional coefficients of lubricated surfaces should be relatively constant up to a certain ambient temperature, termed "the transition temperature," T, which for the purposes of the present invention is the temperature beyond which the kinetic coefficient of friction rises above 0.2. Clearly, a superior lubricating composition has a transition temperature substantially higher than the ambient temperature under working conditions.

Wear is much more difficult to adequately measure and predict than friction. It can vary over a large range under controlled conditions depending on the load. Gears and many machine elements require quite low wear to achieve acceptable lifetimes. The addition of extreme pressure (EP) chemical additives to a lubricating oil can increase the load-carrying capacity of the lubricant many times over. EP additives are thus of considerable economic importance to industry.

There are four mechanisms acting alone and in concert which contribute to wear; they are corrosion, fatigue, plowing, and adhesion. Adhesion occurs under conditions of nearly atomic cleanliness and is probably concomitant to plowing. Plowing wear occurs when a hard, sharp surface irregularity, or third body (e.g., a dust particle), plows through the surface, removing the boundary layers and bringing clean surfaces into contact where they may adhere. Plowing also creates more ridges and surface irregularities which undergo plastic deformation until they fatigue, fracture and leave the surface. This surface metal fatigue mechanism, with or without plowing, is evidenced by micropitting of the surface.

Corrosive wear occurs when the surface material reacts chemically with its environment, e.g., metal oxides are formed by reaction with oxygen or water in the air or lubricant, or reaction with the lubricant itself, and the reaction products are removed from the surface. Corrosive wear is often found where chemically active additives are used to achieve EP properties, but are found to react with the surface to its detriment, e.g., sulfurized and phosphosulfurized lubricant additives can be corrosive towards nonferrous materials.

The formation of films on metallic surfaces is thermodynamically favored, but the thickness of surface films ranges from a few hundredths of a micro inch for single molecule layers of absorbed gases to several dozen micro inches for thick films from oils with EP additives. The problem from the boundary lubrication standpoint is to provide a boundary film with the proper chemical and physical characteristics to control friction and wear, and the correct chemical properties to avoid detrimental surface corrosion.

As the last statement implies, a balance of chemical properties is required of EP additives. While it is known that certain sulfur, phosphorus and chlorine compounds can lead to enhanced load-carrying ability and the action of these additives is partly attributed to the formation of a chemical product film on the surface, the additive must not corrode the surface of alloys containing nonferrous metals.

It is known in the art that additives comprising chemically active constituents such as sulfur, chlorine and phosphorus, will impart extreme pressure properties to a mineral oil. Sulfurized materials, in particular, have often been used. Such materials include various oils of mineral, animal and vegetable origin.

The process of sulfurization consists of heating under suitable conditions the proper ratio of sulfur to oil. Unfortunately, the products so obtained have often disagreeable auxiliary properties, such as a tendency to sludge, corrosiveness towards nonferrous metals, especially copper, incompatibility with other oil additives, turbidity, acidity, instability and a strong odor.

Sulfurzed materials found in the prior art include sulfurized simple esters of fatty acids, U.S. Pats. 2,179,061 and 2,179,065; sulfurized tall oil, 2,631,129; sulfurized simple esters of tall oil, 2,631,131; sulfochlorinated mixtures of olefins, or acids, or esters, in the presence of an epoxy compound, 3,316,237; and sulfurized partial ester metal salts of unsaturated dibasic carboxylic acids, 3,501,413.

A particularly useful and valuable additive of animal origin is sulfurized sperm whale oil, 2,179,060, 1,179,063, and 2,179,066. Recently, the Secretary of the Interior placed an embargo on the importation of sperm whale oil into the United States by assigning all of the remaining whale species to the endangered species list. Since the United States uses 25–30 percent of the world's whale products, this should have an appreciable effect on efforts to conserve the remaining specimens. Thousands of whales and over a million barrels of oil per year are involved. Sperm whale oil is an important ingredient in cutting oils, gear oils, transmission fluids, soaps, and lubricants for precision instruments.

One of the objects of the present invention is to find a highly satisfactory and efficient substitute for sulfurized sperm whale oil in lubricants which is free of disagreeable side effects.

Another object is to provide new addition agents for greases and lubricants which impart valuable oiliness properties, including high pressure, antiwear and antifriction properties.

A still further object of this invention is to provide addition agents for greases and lubricants which are non-corrosive towards nonferrous metals, especially copper.

Yet another object of this invention is to provide addition agents for greases and lubricants which are stable,

SUMMARY

Extreme pressure, antifriction and antiwear additives for lubricating oils are prepared by sulfurizing certain hydroxyesters to the extent of 3–15 percent sulfur by weight. The hydroxyesters are formed by the reaction of a fatty acid containing from about 8 to about 25 carbon atoms with alkyl epoxides containing about 2 to 25 carbon atoms. The fatty acids may be oleic and linoleic acid obtainable, for example, from derosinified tall oil. Alternatively, a mixture of $C_{10}$–$C_{25}$ olefins is included with the hydroxyester or the fatty acid and alkyl epoxide in the mole ratio of about 0.5–2:1:1 before sulfurizing.

The sulfurized hydroxyesters are superior oiliness additives. They are superior or equivalent both to sulfurized sperm whale oil and to sulfurized simple esters in at least several important respects. It is found, for example, in the Falex EP Test that the hydroxyesters withstand maximum loads several hundred pounds above those of the simple esters at the same percentage of sulfurization. The sulfurized hydroxyesters form stable lube oil compositions, are compatible with lead naphthenate, and are noncorrosive to copper. They also possess excellent antifriction and antiwear properties as determined by the 4-Ball Wear Test and the Godfrey Tribometer. They are thermally stable, nonsludging and nontoxic in ordinary use.

DESCRIPTION OF THE INVENTION

Products of the reaction of a fatty acid with an epoxide which are suitable for sulfurization to produce the lubricating oil additives of the present invention are believed to correspond to the following formula of a hydroxyester,

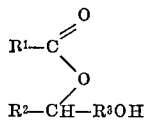

wherein $R^1$ is an aliphatic radical of 8–25 carbon atoms, $R^2$ is H or an aliphatic radical of less than 20 carbon atoms and $R^3$ is $-CH_2-$ or $-CH(CH_3)-$. $R^1$ and/or $R^2$ are unsaturated.

The hydroxyesters can be produced by reacting a fatty acid with an alkenyl or alkyl epoxide, or by forming the partial ester of a glycol. Other reaction products can be present in greater or lesser amounts. Examples of the fatty acids comprise unsaturated monoethenoid acids such as oleic acid, $C_{17}H_{33}COOH$, palmitoleic acid, $$C_{15}H_{29}COOH,$$

petroselenic acid, $C_{17}H_{33}COOH$, erucic acid, $$C_{21}H_{41}COOH,$$

gadoleic acid, $C_{19}H_{37}COOH$, vaccenic acid, $$C_{17}H_{33}COOH,$$

and other naturally occurring and synthetic acids of the formula $C_nH_{2n-1}COOH$; and unsaturated polyethenoid acids such as linoleic acid, $C_{71}H_{31}COOH$, as well as substituted acids such as ricinoleic acid.

Also included are saturated acids such as n-undecanoic, $C_{10}H_{21}COOH$, lauric, $C_{11}H_{23}COOH$, myristic, $$C_{13}H_{27}COOH,$$

palmitic, $C_{15}H_{31}COOH$, stearic, $C_{17}H_{35}COOH$ and other naturally occurring and synthetic acids of the formula $C_nH_{2n+1}COOH$. Branched-chain fatty acids are also included.

Examples of the epoxides which may be utilized in this invention include the 1,2-alkyl epoxides, such as ethylene oxide, propylene oxide and epoxides produced by the reaction of cracked wax olefins with hydrogen peroxide. Cracked wax olefins are predominantly straight chain $C_{15}$–$C_{20}$ alpha-olefins such as those obtained by cracking wax. Other epoxides can also be utilized, as well as the glycols. Examples of the glycols include 1,2 and 1,3 glycols such as 2,4-pentanediol, 1,2-hexanediol, etc. Preferred embodiments of the invention are the product of the reaction of oleic or linoleic acid with a $C_{15}$–$C_{20}$ alkyl epoxide derived from cracked wax alpha-olefins. The reaction product is sulfurized to the extent of about 3–15 percent sulfur by weight.

Tall oil is a by-product of the sulfate process for the manufacture of wood pulp. It consists of about 50 percent resin acids. The resin obtained from various species of pine is called rosin, which is chiefly abietic acid, $$C_{20}H_{30}O_2$$

The remaining 50 percent of tall oil consists of unsaturated fatty acids, chiefly oleic and linoleic acids. Thus, "derosinified tall oil" is a convenient source of these unsaturated acids. Rosin is a source of the undersirable auxiliary properties of lube oil additives mentioned earlier when it is present in high percentage in tall oil prior to neutralization and/or sulfurization. Derosinified tall oil is commercially available. For use in embodiments of the present invention, the derosinified tall oil contains less than five percent of rosin. Derosinified tall oil is available from Arizona Chemical Company as Acintol FA1 Special, Acintol FA2, etc.

In a preferred embodiment of the invention, derosinified tall oil is reacted with a $C_{15}$–$C_{20}$ cracked wax epoxide. The reaction product is sulfurized to the extent of 4–10 percent of sulfur by weight.

In still another embodiment of this invention, derosinified tall oil is reacted with $C_{15}$–$C_{20}$ cracked wax epoxide and the product is mixed with $C_{10}$–$C_{25}$ olefins in a mole ratio of 1:0.5–2 and the mixture sulfurized to the extent of 4–10 percent sulfur by weight.

Alternatively, the epoxide, derosinified tall oil, or fatty acids, and the olefins may be simply mixed together in the mole ratio of about 1:1:0.5–2 and sulfurized to the extent of 4–10 percent sulfur by weight. Although the effectiveness of these materials as lubricating additives is independent of any particular supposition about the structure of the sulfurized products, it is believed that the sulfurization step introduces sulfur by forming linkages with $-(S)_n-$ between ethylenic double bond positions. Thus olefins are also effective in forming these linkages and offer an economical alternative to unsaturated hydroxyesters if, and only if, they are included in moderation. A substantial amount of unsaturated hydroxyester must necessarily be present to impart the characteristic extreme pressure and other properties of this additive invention.

Olefins which find use in the present invention are monoethenoid, or polyethenoid, or conjugated olefins of about 10–25 carbon atoms. The olefins can be straight-chain or branched-chain alkenes. The olefins are preferably alpha-olefins such as those obtained from cracking wax (cracked-wax olefin).

The hydroxyesters of the present invention may be named as monoesters of a glycol. Illustrative compounds which find use within the scope of this invention include 1-hydroxy-2-isopropyl oleate, 1-hydroxy-2-isopropyl linoleate, 1-hydroxy-2-ethyl oleate, 1-hydroxy-2-ethyl linoleate, 1-hydroxy-2-pentadecyl oleate, 1-hydroxy-2-eicosyl linoleate, 1-hydroxy-2-pentadecenyl stearate, 1-hydroxy-2-eicosenyl laurate, 1-hydroxy-1-methyl-2-propyl linoleate, etc.

Additive medium

The compounds of this invention may be used singly or preferably in combinations of two or more in an oil of lubricating viscosity. The lubricating oil can be any relatively inert and stable fluid of lubricating viscosity. Such lubricating fluids generally have viscosities of 35–50,000 Saybolt Universal Seconds (SUS) at 100° F. The fluid medium or oil may be derived from either natural or synthetic sources. Included among the natural hydrocarbonaceous oils are paraffin-base, naphthenic-base or mixed-base oils. Synthetic oils include polymers of various olefins, generally of from 2–6 carbon atoms, alkylated aromatic hydrocarbons, etc. Nonhydrocarbon oils include polyalkylene oxide, polyethylene oxide, aromatic ethers, silicones, etc. The preferred media are the hydrocarbonaceous media, both natural and synthetic. Preferred are those hydrocarbonaceous oils having viscosity $V_{100}$ of about 100–4000 SSU and particularly those having viscosity $V_{100}$ of about 200–2000 SSU.

The lubricating oil will be present at 75 or greater percent by weight of the final lubricant composition. In concentrates, however, the oil may be present as 10–75 percent by weight. These concentrates are diluted with additional oil prior to being placed in service to obtain the requisite concentration.

Other additives may also be present in the composition of this invention. Materials may be added for enhancing the EP effect of the additive, or providing other desirable properties to the lubricating medium. These include such additives as rust and corrosion inhibitors, antioxidants, oiliness agents, detergents, foam inhibitors, antiwear agents, viscosity index improvers, pour point depressants, etc. Usually these will be in the range of from about 0–5 percent by weight, more generally in the range from about 0–2 percent by weight of the total composition. Typical additional additives found in compositions of the present invention include lead naphthenates, phenolic and arylamine antioxidants, zinc dihydrocarbyl dithiophosphates, rust inhibitors, such as the metal sulfonates, foam inhibitors, such as the polymethylsiloxanes, etc.

EXAMPLES

Example 1.—Sulfurized cracked wax epoxide oleate

Ester.—A mixture of 250 grams (about 1 mole) epoxidized $C_{15}$–$C_{18}$ cracked-wax olefin (Ashland Oil and Refining "Nedox 1518"), 274 grams (about 1.1 mole) oleic acid, and 5 grams $H_2SO_4$ (catalyst) was stirred in a glass flask for 12 hours at 100–150° C. and the product washed three times with water to remove the $H_2SO_4$. The product was a viscous tan oil; saponification number 112 mg. KOH/g., acid number 20 mg. KOH/g., infrared spectrum typical of hydroxyester with some ether structure present.

Sulfurization.—276 grams of the above hydroxyester and 14 grams of sulfur were stirred for 6 hours at 160–167° C. in a glass flask with $N_2$ sparge. The product was a dark brown oil; saponification number 113 mg. KOH/g., 4.7% S.

Example 2.—One-step reaction 128 grams (about 0.55 mole) $C_{14}$–$C_{16}$ cracked-wax olefin epoxide (Union Carbide), 141 grams (about 0.5 mole) oleic acid, and 20.5 grams (about 0.64 mole) sulfur at 170–180° C. was stirred for 15 hours under $N_2$ sparge. The product was a brown, viscous oil; 6.1% S, acid number 6.7 mg. KOH/g., infrared spectrum typical of ester with hydroxyl and some ether structure.

Example 3.—Sulfurized ester-olefins 104 g. of $C_{14}$–$C_{16}$ cracked-wax epoxide tallate was mixed with 50 g. of $C_{15}$–$C_{20}$ cracked-wax olefin and 17 g. of sulfur. The mixture was stirred for 7.5 hours at 166–174° C. under $N_2$. 166 g. of product was obtained. The product was a brown oil containing 10% S.

Other examples are in the attached table. In some examples the acid catalyst was neutralized with $Ca(OH)_2$ and the hydroxyester filtered instead of being washed with water.

The simple esters shown for comparison were made by conventional acid-catalyzed reaction between the carboxylic acid and alcohol. They were sulfurized in the conventional manner at about 170° C.

TABLE I.—EXAMPLES OF SULFURIZED HYDROXYESTERS

| | 1 | 2 | 3 | 4 | 5[2] |
|---|---|---|---|---|---|
| Esterification: | | | | | |
| $C_{15}$–$C_{18}$ cracked-wax epoxide, g | 250 | | | | |
| $C_{14}$–$C_{16}$ cracked-wax epoxide, g | | 233 | 128 | 128 | |
| Oleic acid, g | 283 | 282 | | | |
| Tall acid (Acintol FA2[1]), g | | | 144 | 144 | |
| $H_2SO_4$, g | 3 | 4.2 | 2.7 | 2.7 | |
| Temp., °C | 130–50 | 135–42 | 137–42 | 137–42 | |
| Time, hours | 6 | 2.5 | 4 | 4 | |
| Catalyst removal by | $H_2O$ | $Ca(OH)_2$ | $H_2O$ | $Ca(OH)_2$ | |
| Yield, g | 519 | 514 | 256 | 258 | |
| Sulfurization: | | | | | |
| Hydroxyester, g | 307 | 94 | 92 | 92 | 104 |
| Olefin, g | | | | | 50 |
| Sulfur, g | 24 | 6 | 8 | 8 | 17 |
| Temp., °C | 160–200 | 168–72 | 167–72 | 167–75 | 166–74 |
| Time, hours | 16 | 2 | 3 | 3 | 7.5 |
| Yield, g | 265 | 96 | 96 | 99 | 166 |
| Product: S, percent by weight | 5.7 | 5.6 | 7.4 | 6.9 | 10 |

[1] Derosinified tall oil supplied by Arizona Chemical Co.
[2] Sulfurized ester-olefin mixture.

LUBRICANT PERFORMANCE

The lubricating oil additives of this invention have five fundamental and superior properties which have been subjected to laboratory testing. These properties have been compared with those of others known EP additives.

(1) The additives have been tested for EP properties by means of the Falex Machine Test. In the Falex test, stationary vee-blocks are pressed on either side of a rotating steel shaft by a nutcracker arrangement of lever arms. Test specimens are immersed in a tank of test lubricant which is at a known temperature. Loading is automatically increased until seizure occurs. The failure point is indicated by shearing of the pin holding the vertical shaft. The load at failure in pounds is taken as a quantitative measure of the EP property of the oil composition. Mineral oils may fail at 600–900 pounds. Oils with moderate EP additives will fail at 1000–2000 pounds and very extreme pressure additives will permit loadings in excess of 3000 pounds.

(2) The additives have also been tested for antiwear properties under extreme pressure condition by means of the well-known 4-Ball Test. In this test three ½" diameter steel balls are clamped together and immersed in the test lubricant. A fourth ball is then rotated at about 1800 r.p.m. in contact with the other three balls. A 20–50 kg. load is applied, forcing the rotating ball against the three stationary balls. The test is run for 60–30 minutes and the sizes of the wear scars on the three stationary balls are measured and the average scar size in millimeters reported. The smaller the scar, the greater the antiwear properties of the test lubricant. For example, under a 20 kg. load for 60 minutes the base oil gives a wear scar of 0.76 mm. and lubricants which give a wear scar of less than 0.5 mm. are considered acceptable antiwear lubricants; it is preferred that the wear scar be on the order of 0.3–0.6 mm. Lubricants which give 4-ball scars in the latter range are generally found also to give good performance in the L-38 Gear Lubrication Test (Federal Test Methods Standard 791A, Method No. 6506-T), a well-known test for evaluating gear lubricants. Both the Falex and the 4-Ball tests are described and referenced in American Association of Lubrication Engineers Standard Handbook for Lubrication Engineers, chapter 27, James J. O'Connor, editor, McGraw-Hill, New York, 1968.

(3) Antifriction properties of the additive as a function of temperature are determined from tests conducted with the Godfrey Tribometer. The Godfrey Tribometer is described in ASLE Transactions 7, 24–31 (1964). In the present tests on that instrument, a loaded (1 kg.) bearing ball slides at low speed against a rotating steel ring lubricated with test lubricant and held at known temperature. The kinetic coefficient of friction, $f_K$, and the static coefficient of friction, $f_S$, are measured as well as the transition temperature, T, at which $f_K$ rises above 0.2. Base oil-lubricated specimens give coefficients of about 0.15–0.3. Satisfactory boundary lubrication is achieved when the coefficient is reduced below 0.15–0.20. The transition temperature to high friction should be high and is considered satisfactory if above 150° C.

(4) A stability test for leaded gear lubricants is performed by heating a lubricating oil composition containing the usual additives and the test additive to about 150° F. and allowing it to stand at this temperature until a sludge or visible amounts of particulate reaction products are formed. Lead naphthenate will be present in the oil formulation to about 3.6 percent by weight. To pass this test, the time before appreciable sludge formation should be in the order of 10 days. In another stability test, a 2 percent by weight composition of additive in oil is held at 300° F. The additive passes this stability test if it fails to form appreciable amount of sludge before about 4 days.

(5) The copper strip test is very important since it is the criterion for lack of corrosivity towards nonferrous metals. A copper strip is immersed into 2 percent by weight composition of test additive in oil at 250° F. for three hours. The degree of discoloration of the copper strip is obtained from a comparison chart. A rating of 1a indicates a very low degree of discoloration and consequently slight corrosivity of the additive towards copper. A test of 1b or 2a is less satisfactory etc. This is an ASTM Test Method D–130.

Table II presents test results on some compositions of present invention and some comparative results for sulfurized sperm whale oil (SSWO) and sulfurized simple esters of tall oil (sulfurized tallates). The sulfurized hydroxyesters are clearly equal or superior to the sulfurized simple esters and SWO in every test. It is noteworthy that the sulfurized hydroxyesters achieve excellent performance characteristics at low levels of sulfurization (4–7 percent sulfur by weight). The sulfurized hydroxyesters display very low corrosivity towards copper, moderate extreme pressure properties, low wear, high stability, and low friction as lubricating oil additives. These properties appear at low levels of sulfurization which is a particular surprising and favorable results.

In Table III, several lubricating oil formulations of the additivites of this invention are evaluated in the same way.

In addition to the good frictional properties for steel/steel shown in the table, a sulfurized hydroxyester provised exceptionally low friction for bronze/steel in tribometer tests.

TABLE III

| Additive at 4.5% in 126 SSU (100° F.) Neutral oil | Bronze/steel friction | |
|---|---|---|
| | Static | Kinetic |
| Sulfurized sperm whale oil (10% S) | 0.14 | 0.080 |
| Sulfurized myristyl tallate (7.3% S) | 0.15 | 0.097 |
| Sulfurized crack-wax epoxide oleate (5.6% S) | 0.11 | 0.073 |

Another useful and unexpected advantage of the sulfurized hydroxyesters is compatibility with lead naphthenate in gear oil formulations. Such a formulation containing 3.6% lead naphthenate and 4 percent sulfurized sperm whale oil precipitated lead sulfide after only 7 days on storage at 150° F. Replacement of the sulfurized sperm whale oil with sulfurized epoxide oleate permitted the oil to remain clear for more than 40 days.

TABLE II

| Composition [1] | | Sulfur [2] content | Copper strip [3] | Stability [4] | 4-ball [5] | Falex [6] | Tribometer [7] | | |
|---|---|---|---|---|---|---|---|---|---|
| | | | | | | | $f_K$ | $f_S$ | T, °C. |
| Hydroxyesters | | | | | | | | | |
| Acid | Epoxide | | | | | | | | |
| Oleic | $C_{15}$-$C_{18}$, cracked wax [8] | 4.7 | 1a | 8–10 | 0.37 | 1,450 | 0.10 | 0.14 | 240 |
| Do | do | 5.7 | 1a | 8–10 | 0.38 | 1,300 | | | |
| Do | $C_{14}$-$C_{16}$, cracked wax [9] | 5.6 | 1b | 8–10 | 0.39 | 1,500 | 0.095 | 0.13 | 180 |
| Do | do | 7.0 | 1a | 5–6 | 0.41 | 1,290 | 0.097 | 0.12 | 260 |
| Tall oil [10] | do | 7.4 | 1a | | 0.45 | 1,480 | | | |
| Do | do | 6.9 | 1b | | 0.49 | 1,420 | | | |
| Ester-olefin | | | | | | | | | |
| $C_{14}$-$C_{15}$ | Cracked wax, tallate | 10 | 1b | | 0.5 | 1,480 | | | |
| $C_{15}$-$C_{20}$ | Cracked wax, olefin, 2:1 | | | | | | | | |
| Simple esters | | | | | | | | | |
| Acid | Alcohol | | | | | | | | |
| Tall oil | n-$C_{14}$-$C_{15}$ [11] | 7.3 | 1a, b | | 0.36 | 1,250 | 0.11 | 0.14 | 180 |
| Do | n-$C_{14}$-$C_{15}$ [11] | 10.0 | 1a, b | 4–6 | 0.40 | 1,350 | | | |
| Oleic | Oleyl | 10.0 | 1b | | 0.59 | 1,250 | | | |
| Do | n-$C_{14}$-$C_{15}$ [11] | 5.0 | 1a | | 0.42 | 960 | | | |
| Tall oil | n-$C_{14}$-$C_{15}$ [11] | 7.3 | 1a, b | | | 1,250 | 0.11 | 0.14 | 180 |
| Do | n-$C_{14}$-$C_{15}$ [11] | 8.8 | 1a, b | 4–6 | 0.40 | 1,350 | | | |
| SSWO [12] | | 10 | 1a | 3–6 | 0.38–0.44 | 1,400–1,500 | 0.10 | 0.13 | 150–200 |

[1] Composition is 2% additive by weight (unless otherwise noted) is solvent-refined neutral oil, $V_{100}$=480 SSU.
[2] Percent sulfur by weight of sulfurized product.
[3] Copper strip immersed in composition at 250° F. for 3 hours.
[4] Composition at 300° F. Days to appreciable sludge formation.
[5] Scar width in mm. in 4-ball test (20 kg., 1,800 r.p.m., 1 hour).
[6] Load in pounds at failure.
[7] 4.5% by weight in solvent-refined neutral oil with $V_{100}$=126 SSU.
[8] Epoxide of $C_{15}$-$C_{18}$ alpha-olefins.
[9] Epoxide of $C_{14}$-$C_{16}$ alpha-olefins.
[10] Derosinified tall oil.
[11] Shell Chemical Co., Neodol 45.
[12] Sulfurized sperm whale oil.

I claim:

1. A lubricating composition comprising a major proportion of a lubricating oil and from about 0.1 percent to about 10 percent by weight of a sulfurized hydroxy ester derived from the reaction of a $C_9$–$C_{26}$ alkenyl carboxylic acid with a cracked wax epoxide.

2. A lubricating composition according to claim 1 wherein the hydroxyester is sulfurized to the extent of from 3 to 15 percent sulfur by weight of ester.

3. A lubricating composition according to claim 1 wherein the alkenylcarboxylic acid is selected from the group consisting of oleic acid and linoleic acid.

4. A lubricating composition according to claim 1 wherein the hydroxyester is derived from derosinified tall oil, and said hydroxyester is sulfurized to the extent of 3–15 percent sulfur by weight.

5. A lubricating composition according to claim 1 wherein the hydroxyester is derived from $C_9$–$C_{26}$ alkenylcarboxylic acids and the epoxides of $C_{14}$–$C_{18}$ alpha-olefins.

References Cited

UNITED STATES PATENTS

| | | | |
|---|---|---|---|
| 2,204,538 | 6/1940 | Lincoln et al. | 252—48.6 |
| 3,455,830 | 7/1969 | Lawrence et al. | 252—48.6 |
| 2,360,904 | 10/1944 | Smith | 252—48.6 X |
| 3,316,237 | 4/1967 | Imparto et al. | 252—48.2 X |

OTHER REFERENCES

Kirk-Othmer, "Encyclopedia of Chemical Technol.," vol. 19 (2d ed.), 1969, pp. 617–622.

DANIEL E. WYMAN, Primary Examiner

W. H. CANNON, Assistant Examiner

U.S. Cl. X.R.

260—125